(12) United States Patent
Bhat et al.

(10) Patent No.: US 12,373,441 B1
(45) Date of Patent: Jul. 29, 2025

(54) USING A MULTI-MODEL ARCHITECTURE FOR RETRIEVAL-AUGMENTED GENERATION (RAG)

(71) Applicant: Citibank, N.A., New York, NY (US)

(72) Inventors: Ganesh Prasad Bhat, West Orange, NJ (US); Joshua Goldman, Merrick, NY (US); Ramee S. Karthikeyan, Monmouth Junction, NJ (US); Wei Jie Ng, Jersey City, NJ (US); Subramanian Sankaran, Flushing, NY (US)

(73) Assignee: CITIBANK, N.A.

( * ) Notice: Subject to any disclaimer, the term of this patent is extended or adjusted under 35 U.S.C. 154(b) by 0 days.

(21) Appl. No.: 19/185,406

(22) Filed: Apr. 22, 2025

(51) Int. Cl.
*G06F 16/2455* (2019.01)
*G06F 9/451* (2018.01)
*G06F 16/22* (2019.01)

(52) U.S. Cl.
CPC ........ *G06F 16/24568* (2019.01); *G06F 9/451* (2018.02); *G06F 16/2237* (2019.01)

(58) Field of Classification Search
CPC ............... G06F 16/24568; G06F 9/451; G06F 16/2237; G06N 3/0475; G06N 20/00
See application file for complete search history.

(56) References Cited

U.S. PATENT DOCUMENTS

| | | | | |
|---|---|---|---|---|
| 11,093,498 | B2* | 8/2021 | Sirin | G06N 5/02 |
| 11,113,323 | B2* | 9/2021 | Yoon | G06F 16/3329 |
| 12,254,272 | B1* | 3/2025 | Cetoli | G06F 40/40 |
| 12,306,834 | B1* | 5/2025 | Ferchau | G06F 16/24542 |
| 2024/0370517 | A1* | 11/2024 | DeVos | G06F 40/30 |
| 2025/0131247 | A1* | 4/2025 | Mondlock | G06N 3/0475 |

\* cited by examiner

*Primary Examiner* — Hares Jami
(74) *Attorney, Agent, or Firm* — Perkins Coie LLP

(57) ABSTRACT

Systems and methods disclosed herein generate validated responses using artificial intelligence (AI)-based models. The system obtains/receives an output generation request (e.g., from a graphical user interface (GUI)) that can include a document set and a query set. The system classifies the query set by partitioning it into multiple query subsets and assigning a complexity score. Based on the classification, the system generates a computational workflow set using a first AI model set to retrieve a resource set responsive to the query set. The system executes the workflow using a second AI model set (the same as or different from the first AI model set) and validates the retrieved resources against predefined criteria (e.g., rules, guidelines). If the resources satisfy the criteria, the system generates a response using a third AI model set. The system can display a graphical layout on the GUI showing the request, retrieved resources, and/or generated response.

20 Claims, 12 Drawing Sheets

FIG. 2C

Output ∨

Create user stories: based on the CRS Timeout image — 208

Activities ∧ — 206

Steps

▲ User /Ask — Chat and ask questions about data and documents in your Data Vault ▲ List /Generate Epics, User Stories and Acceptance Criteria — Generate Epics, User Stories and Acceptance Criteria ▲ The /Generate Epics — Generate Epics answer /Generate User Stories and Acceptance Criteria — Generate User Stories and Acceptance Criteria 1. User /JIRA Comment Analyzer — Analyze and summarize any comments by entering a JIRA url As
As
As As a user, I want clear instructions on how to complete the application after saving it for later, so I can easily pick up where I left off.

/Generate User Stories and Acceptance Criteria | Be specific about what you are trying to achieve etc. — 210

Response settings: Highly Accurate ∨ response. The use of color-coding (blue and purple) helps distinguish different stages and paths within the system.\n", "type": "FILE"}, "crstimeoutmodal_index": {metadata": "People: None\n\nOrganizations: Organization #1, Organization #2\n\nLocations: None\n\nProducts/Brands: Program #1, Program #2\n\nTopics/Keywords: application, approval, timeout, save for later, stay active\n\nEvents: None\n\nSummary: The image shows a screen from a program application process. The user has been approved for two programs and is being prompted to compare benefits and pick a program. A timeout warning appears, informing the user that they are about to time out but can finish the application later by receiving an email. The user can choose to "Save for later" or "Stay active." The two program options are displayed, one of which is the Program #1. The user can continue with the selected program or scroll up to select the other Program #2.", "type": "FILE"}, "risk_controls_index": {"metadata": "This index will be used to apply risk and control policies and procedures to make sure that the epics and stories are compliant with the company's policies and procedures.", "type": "JIRA"}]

▼ The sequence we will follow

[ {"index": "crstimeoutmodal_index", "last": false, "questions": [ "What are the key elements and user interactions depicted in the CRS Timeout Modal image?", "What information is presented to the user in the timeout warning?", "What options are available to the user when the timeout warning appears?", "What is the purpose of the 'Save for later' and 'Stay active' options?", "What are the names of the programs being offered to the user?" ], "step": 1, "type": "file" }, {"index": "stories_index", "last": true, "questions": [ "Based on the information extracted from the CRS Timeout Modal image, generate user stories to capture the user interactions with the 'Save for later' and 'Stay active' options.", "Develop user stories that address the presentation of program options to the user after approval.", "Generate user stories for the accurate display of the Program #1 and Program #2 details within the timeout modal." ], "step": 2, "type": "jira" } ]

▲ Responses generated from each data source

| Generate User Stories and Acceptance Criteria | Be specific about what you are trying to achieve etc.

Response settings: Highly Accurate ⌄        

*FIG. 2D*

Here are your stories

Handle Sessions Timeout Gracefully

As a user, I want to be notified when my session is about to time out so that I don't lose my progress on my credit card application. This includes options to 'Stay Active' or 'Save for Later'.

Acceptance Criteria
- Given the user is on the program application page, When the session timeout warning appears, Then the user sees a modal window with a clear heading and message.
- Given the user sees the timeout modal, When the user clicks 'Stay Active', Then the session timeout is extended and the modal closes.
- Given the user sees the timeout modal, When the user clicks 'Save for later', Then the application progress is saved, the user receives a confirmation message, and the modal closes.
- Given the user clicks 'Save for later', When the application progress is saved, Then the saved data is encrypted and security... (Risk and Controls) — 216a
- Given the user's session times out, When the user attempts to access the application, Then the user is prompted to log in ... (Risk and Controls)
- Given the user chooses 'Save for later', When the application saves the progress, Then an email is sent to the user with instructions on how to resume the application later.
- Given the user is presented with the timeout modal, when the user selects 'Stay Active', then the session timer is reset and the modal is closed.
- Given the user is presented with the timeout modal, when the user selects 'Save for Later', then the application data is saved securely and the user receives a confirmation message and an email with instructions on how to resume the application later.

Priority
High

Story Points
5

✎ Edit  ⧉ Copy  ↻ Retry  ↑ Upload to JIRA

Save Application Progress

As a user, I want to be able to save my application progress and return to it later so that I can complete it at my convenience. — 216b

Acceptance Criteria
- Given the user has saved their application, When they return to the application, When they return to where they left off.
- Given the user has saved their application, When they try to access the application using the link in the email, Then they are taken directly to where they left off.
- Given the user has saved their application, When they try to access the application after a long period, Then the system should handle the situation gracefully, perhaps prompting them to log in again.
- Given the user saves their application, When the system saves the application data, Then the data is securely stored and encrypted.

[ ✎ Generate User Stories and Acceptance Criteria ]   Be specific about what you are trying to achieve etc.

Response settings: Highly Accurate ⌄

*FIG. 2E*

Product Wizard Settings

302 — Use general knowledge
Use general knowledge to answer questions.

304 — Stream responses
Ask questions and get responses in real-time.

Google Gemini <>

306 — Hide Activities?
Hide the intermediate activities performed by the Large Language Models 308 — Include all context in the question?
This option allows you to include the entire context of the docs in the data vault instead of just short summaries.

310 — Enable Human in the Loop?
This option will allow you to review and intervene in the process of generating the right questions that are asked to your data vault.

312 — Enable Contemplator?
This will enable the contemplator feature.

314 — Mock LLM Responses?
Generate mock responses from the LLMs.

Update Settings

*FIG. 3*

USING A MULTI-MODEL ARCHITECTURE FOR RETRIEVAL-AUGMENTED GENERATION (RAG)

BACKGROUND

Artificial intelligence (AI) models often operate based on extensive and enormous training models. The models include a multiplicity of inputs and how each should be handled. When the model receives a new input, the model produces an output based on patterns determined from the data the model was trained on. A large language model (LLM) is a language model notable for its ability to achieve general-purpose language generation and other natural language processing tasks such as classification. LLMs can be used for text generation, a form of generative AI (e.g., GenAI, Gen AI, or GAI), by taking an input text and repeatedly predicting the next token or word. LLMs acquire these abilities by learning statistical relationships from text documents during a computationally intensive self-supervised and semi-supervised training process. Generative AI models, such as LLMs, are increasing in use and applicability over time.

Retrieval-augmented generation (RAG) is a technique that enables generative AI models to retrieve and incorporate new information. RAG modifies interactions with a generative AI model so that the model responds to user queries with reference to a specified set of documents, using this information to supplement information from its pre-existing training data. This enables the generative AI model to use domain-specific and/or updated information. Use cases include providing chatbot access to internal company data or generating responses based on authoritative sources. Unlike traditional LLMs that rely on static training data, RAG pulls relevant text from databases, uploaded documents, or web sources. By dynamically retrieving information, RAG enables AI to provide more accurate responses without frequent retraining. However, responses generated by conventional RAG systems may include incorrect, outdated, or irrelevant information due to incorrect information retrieved. For example, if a RAG system retrieves an outdated document that contains obsolete data, the response generated by conventional RAG systems may include this outdated information.

BRIEF DESCRIPTION OF THE DRAWINGS

FIG. 2C is a screenshot illustrating a list of actions configured to be executed using a data generation platform according to some implementations of the present technology.

FIG. 2D is a screenshot illustrating a sequence of intermediate outputs of a data generation platform according to some implementations of the present technology.

FIG. 2E is a screenshot illustrating a response of a data generation platform according to some implementations of the present technology.

FIG. 3 is a screenshot illustrating a set of configurable settings of a data generation platform according to some implementations of the present technology.

Figure 1:
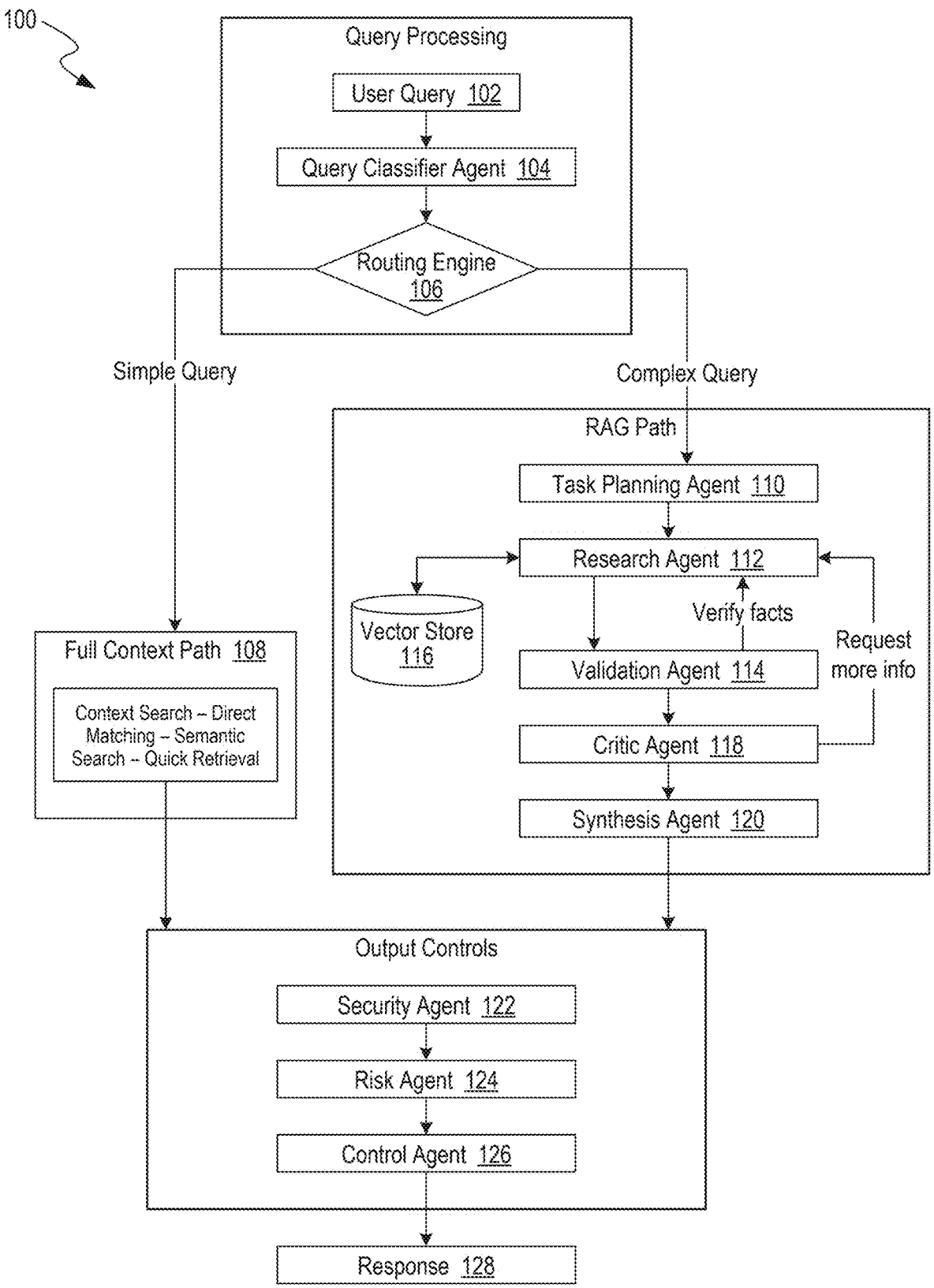
FIG. 1 illustrates an example environment of a data generation platform for generating validated responses using artificial intelligence (AI) models in accordance with some implementations of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Retrieval-Augmented Generation (RAG) is a technique in natural language processing that combines information retrieval and text generation to produce responses to user queries. RAG systems retrieve documents or information from a database or knowledge base based on a degree of relevance of the documents/information with the user's query. Typically, the data to be referenced is converted into vector embeddings, or numerical representations in the form of a vector space. RAG can be used on unstructured (e.g., text), semi-structured, or structured data (e.g., knowledge graphs). Once the information is retrieved, the RAG systems typically use a text generation model (such as, a large language model) to generate a response to the user's query based on both the query and the retrieved documents/information. However, conventional RAG systems typically fail to validate responses before delivering the response to users (e.g., via a user interface). Thus, the information provided may contain inaccuracies, be outdated, or fail to address the user's query. Conventional RAG systems may generate responses that violate guidelines or standards. For example, a response generated by conventional RAG systems may inadvertently include confidential information, violate privacy regulations, promote biased or unethical practices, and so forth.

Inaccurate responses can be caused by errors within the retrieved information. The information retrieved from databases or knowledge bases in conventional RAG systems is not validated before being used to generate the responses. Thus, during information retrieval, conventional RAG systems may retrieve data that is no longer current, contains errors, or is not relevant to the user's query. Using the unvalidated information to generate the response only propagates the inaccuracies. Conventional RAG systems are unable to discern the validity of the data used, and assumes that the retrieved information is accurate and relevant. Thus, as conventional RAG systems generate the response, they combine the unvalidated data with their internal knowledge and the context provided by the query. However, because the retrieved data is flawed, the final response may reflect and further underscore these flaws.

Additionally, conventional RAG systems fail to validate the queries themselves before the information retrieval. Thus, conventional RAG systems may expend computational resources (e.g., Central Processing Units (CPUs), Graphics Processing Units (GPUs)) on processing queries that are ambiguous, poorly formulated, computationally extensive, and so forth. For example, a poorly formulated query may cause the conventional RAG systems to retrieve a large number of documents, many of which may not be relevant to the user's actual requested response. This indiscriminate retrieval not only wastes processing power but also causes increased latency and reduced system performance.

Attempting to create a system to validate the generated responses in conventional RAG systems presented significant technological challenges. Developing such a system required addressing several unknowns in the existing approaches to information retrieval (IR) and response generation, such as determining how to prevent inaccurate information that is retrieved from being used by the AI model(s) generating the response. Conventional RAG systems integrate all of the data retrieved into the response, without an indication of whether the data includes errors or inaccuracies. Thus, inaccuracies or irrelevancies in the retrieved data are directly propagated into the generated responses.

Unlike conventional RAG systems, which simply retrieve and synthesize information based on keyword matching or semantic similarity, validating the generated responses uses the retrieved data's context and quality. For example, validating the accuracy of retrieved information includes cross-referencing data with authoritative sources, checking for the timeliness of the information, and ensuring compliance with guidelines (e.g., industry-specific regulations). However, validating responses accurately created technological uncertainty due to the dynamic and diverse nature of data sources, which can vary in format, structure, provenance, and so forth. Further, the queries (e.g., received from a user) themselves can include errors or non-compliant portions. Processing erred or non-compliant queries wastes computing resources. However, validating the queries themselves before information retrieval created technological uncertainty due to the ambiguity and variability of natural language. Users often express their queries in different ways, using various words, phrases, and structures, leading to multiple interpretations. For instance, a query such as "latest regulations" could imply a need for recent updates, historical changes, or specific compliance guidelines.

To overcome these technological challenges, the inventors systematically evaluated multiple design alternatives. For example, the inventors evaluated rule-based systems that applied predefined validation rules to filter and validate the generated responses. However, this approach proved to be limited by its rigidity and inability to adapt to the dynamic nature of language and data sources. Continuously updating the validation rules was tedious and inefficient. Another design alternative was to use machine learning models to automatically classify and validate the responses based on their content and context. However, the machine learning models consumed substantial computing resources for responses that failed the validation due to errors that occurred before the response generation, such as an incorrect query, incorrect data retrieved, and so forth.

Thus, the inventors experimented with different methods to validate responses generated via RAG systems. For example, the inventors evaluated model architectures to validate not only the generated responses but also the queries and retrieved information. Further, the inventors expanded the validation process into a multi-stage agentic model architecture that uses different AI-based agents to validate the user query, retrieved information, and generated response. As such, the inventors have developed systems (and related methods) for validating responses using artificial intelligence (AI) models (hereinafter the "data generation platform"). The data generation platform obtains (e.g., receives) an output generation request (e.g., from a graphical user interface (GUI) of a computing device) that can include an artifact (e.g., document) set and a query set. The data generation platform classifies the query set by partitioning it into multiple query subsets and assigning a complexity score. Based on the classification, the data generation platform generates a computational workflow set using a first AI model set to retrieve a resource set responsive to the query set. The data generation platform executes the workflow using a second AI model set (the same as or different from the first AI model set) and validates the retrieved resources against predefined criteria (e.g., rules, guidelines). If the resources satisfy the criteria, the data generation platform generates a response using a third AI model set. In some implementations, the data generation platform displays a graphical layout on the GUI showing the request, retrieved resources, and/or generated response.

Unlike conventional RAG systems that rely on all retrieved information to generate the response, the disclosed systems and methods can selectively validate and filter the retrieved information before it is used in the response generation. Thus, rather than using all retrieved information, the data generation platform evaluates each portion of the retrieved information against predefined criteria to validate its accuracy, relevance, and/or compliance. By doing so, the data generation platform can discard data that is outdated, incorrect, irrelevant, and so forth, ensuring that only validated information is used to generate the response. The data generation platform reduces the use of computational resources by removing computational workflows used on irrelevant, incorrect, and/or outdated information. Additionally, the data generation platform can dynamically adjust the validation criteria based on the context of the query to increase the relevance of the generated responses.

Further, by validating the query and assigning a complexity score to the query, the data generation platform can categorize the queries based on their difficulty and the computational resources used to process them. Simple queries (low complexity score) can use computational workflows that require fewer computational resources. On the other hand, complex queries (high complexity score) can use computational workflows that use more computational resources, such as multi-stage retrieval. For complex queries, the data generation platform can allocate additional computational resources. Thus, the data generation platform can tailor the computational workflow of the information retrieval and response generation based on a degree of complexity of the query, while reducing computational resources spent on complex queries via the multi-stage retrieval.

While the current description provides examples of the rule application engine related to LLMs, one of skill in the art would understand that the disclosed techniques can apply to other forms of machine learning or algorithms, including unsupervised, semi-supervised, supervised, and reinforcement learning techniques. For example, the disclosed data generation platform can apply allocation rules using support vector machine (SVM), k-nearest neighbor (KNN), decision-making, linear regression, random forest, naïve Bayes, or logistic regression algorithms, gradient boosting, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Example Implementations of the Data Generation Platform

FIG. 1 illustrates an example environment 100 of a data generation platform for generating validated responses using AI models in accordance with some implementations of the present technology. The environment includes a user query 102, a query classifier agent 104, a routing engine 106, a full context path 108, and a RAG path. The RAG path can include a task planning agent 110, a research agent 112, a validation agent 114, a vector store 116, a critic agent 118, and a synthesis agent 120. The output controls of the environment 100 can include a security agent 122, a risk agent 124, a control agent 126, and a response 128. The query classifier agent 104, routing engine 106, task planning agent 110, research agent 112, validation agent 114, critic agent 118, synthesis agent 120, security agent 122, risk agent 124, and control agent 126 are the same as or similar to AI system 500, illustrated and described in more detail with reference to FIG. 5. The environment 100 can be implemented using components of example computer system 600 illustrated and described in more detail with reference to FIG. 6. Implementations of the example environment 100 can include different and/or additional components or can be connected in different ways.

The user query 102 refers to a user's input into the data generation platform. The user query 102 can be represented in one or more modalities such as text-based questions, commands, requests for information, and so forth. When a user submits a query, the query classifier agent 104 can classify the user query 102 into a type and/or degree of complexity, in order to direct the user query 102 to a particular programmatic workflow (i.e., a full context path or a RAG path). The query classifier agent 104 can use one or more elements of the user query 102 to classify the user query 102, such as the length, specificity, amount of information to be retrieved, estimated latency, amount of system resources estimated to be used, domain of knowledge, and so forth. For example, a query like, "When was document X published?" can be classified as a simple query, as it specifies querying the system for the specific document and retrieving the publication date. In contrast, a more complex query can include queries that instruct the data generation platform to perform a greater number of programmatic workflows (e.g., due to a larger number of information retrieved), such as "Generate an epic, user stories, and acceptance criteria for Project X."

The routing engine 106 routes the query based on the classification results of the query classifier agent 104. For simpler queries with a low degree of complexity, the full context path 108 can be used to retrieve information using methods such as a context search, direct matching, a semantic search, quick retrieval, and so forth. Context searches can be performed by limiting the search space to a particular domain or section relevant to the user query 102. For example, if the user query 102 references a specific document or event, the search can be confined to the sections or context of that document or event that share a degree of similarity to the user query 102 (e.g., vector representations that have a high degree of similarity). The data generation platform can use direct matching, in some implementations, to identify matches to the query terms within the dataset. The data generation platform can map each term in the dataset to its occurrences across the documents. When a user query 102 is received, the data generation platform can locate the document positions that contain the terms specified in the query. In some implementations, the data generation platform performs a semantic search using word embeddings (e.g., Word2Vec, BERT) to represent words and phrases in a multi-dimensional vector space where similar meanings are positioned closer together. The user query 102 can be converted into a vector, and the data generation platform can retrieve documents with vectors that are close to the query vector, using similarity measures like cosine similarity or Euclidean distance. This ensures that contextually relevant information is retrieved, even if the exact terms are not present in the data. In some implementations, to prioritize the speed of retrieving information, the data generation platform caches frequently asked queries, use data structures such as tries or hash tables for fast look-ups, and distribute the query processing across parallel computing resources to handle multiple queries simultaneously.

For more complex queries, the data generation platform can route the user query 102 to the task planning agent 110. An agent (e.g., query classifier agent 104, routing engine 106, task planning agent 110, research agent 112, validation agent 114, critic agent 118, synthesis agent 120, security agent 122, risk agent 124, control agent 126) includes one or more models (e.g., generative, non-generative, and so forth) that operate autonomously or in coordination with other agents. The agent can be trained on specialized data associated with a corresponding task.

The task planning agent 110 decomposes the query into smaller tasks (e.g., operations, sub-queries), sets objectives, and generates a programmatic workflow for retrieving the information. For example, in generating an epic with user stories, the task planning agent 110 breaks down the request into identifying functionalities to be completed by Project X, story components, and acceptance criteria. The objectives define a set of tasks to be achieved for each sub-query and guide the subsequent steps in the workflow. Once the objectives are set, the task planning agent 110 generates a programmatic workflow. The workflow outlines the sequential steps and processes to be executed to retrieve the information and generate the desired output.

In a programmatic workflow, certain tasks may depend on the completion of others. To generate the programmatic workflow, the task planning agent 110 can ensure that tasks are completed in the desired order. For example, the task planning agent 110 can identify these dependencies and sequence the tasks accordingly. For example, if Task B cannot commence until Task A is finished, the task planning agent 110 can place Task A before Task B in the programmatic workflow. The task planning agent 110 can use, for example, dependency graphs or task trees where nodes symbolize tasks and edges denote dependencies. In some implementations, the task planning agent 110 can assign corresponding computational resources to each task. Different tasks may require different amounts of processing power, memory, or other resources. The task planning agent 110 can evaluate the objectives of each task and dynamically distribute resources based on current workload and priorities to adjust allocations in real time or near real time.

The research agent 112 can use the generated programmatic workflow(s) to transmit a request to the vector store 116 to obtain the information, filter the obtained content, and rank the content according to the set objectives. The vector store 116 can store vector representations of the information. Vector representations are mathematical formats that enable the retrieval and manipulation of data. Once the research agent 112 transmits the request, the vector store 116 can retrieve the information in its vectorized form. After obtaining the information, the research agent 112 can filter the content according to the set objectives to remove any redundant, or low-quality (e.g., missing) data. The objectives can include relevance to the user's query, accuracy, compliance with specific regulations or standards, and overall quality.

To ensure the accuracy and/or relevance of the retrieved information, the validation agent 114 can, for example, cross-reference the retrieved information with existing data or criteria to flag inconsistencies found. For example, the validation agent 114 can compare the retrieved information with entries in other databases or using one or more predefined rules to identify discrepancies or inconsistencies. For example, if a user's query includes financial figures, the validation agent 114 can validate the figures against updated financial reports within the database to ensure their accuracy.

The critic agent 118 can identify gaps within the information (e.g., one or more objectives set by the task planning agent 110 not satisfied by the retrieved information validated by the validation agent 114). For instance, if the task planning agent 110 set specific objectives or criteria for the information to be retrieved, the critic agent 118 can evaluate whether the validated information meets these criteria. If not, the critic agent 118 can identify what is missing. The critic agent 118 can generate a set of actions or programmatic workflows to satisfy the one or more unsatisfied objectives. These actions can include additional queries, further data retrieval tasks, or other computational procedures to obtain the missing information. For example, if certain data points are missing or incomplete, the programmatic workflows can specify the queries to retrieve or complete these data points. In some implementations, the critic agent 118 can cause the computing device to automatically execute the set of actions or programmatic workflows.

The synthesis agent 120 can aggregate the retrieved information into a response 128 that is responsive to the user query 102. The synthesis agent 120 can be, for example, an LLM that uses the retrieved information and the user query 102 to generate the response 128. In some implementations, the data generation platform includes a set of output controls performed by a set of AI-based agents. For example, the security agent 122 can detect personal identifiable information (PII), sanitize data, and so forth. The security agent 122 can, for example, identify PII present, such as names, addresses, social security numbers, etc., and then replacing it with anonymized or redacted data.

As used herein, the risk agent 124 can refer to an AI-based component (e.g., engine, module) within the data generation platform that evaluates generated responses against a set of predefined constraints and/or guidelines to that the generated content adheres to applicable regulations, policies, and/or standards. The risk agent 124 can parse the content of the response and identify potential legal, ethical, or business risks, such as the inclusion of sensitive information, violation of privacy laws, breach of confidentiality agreements, and so forth. To identify risks, the risk agent 124 can use rule-based systems, machine learning algorithms, and so forth. For example, the risk agent 124 can compare the response against a database of known risk patterns, keywords, and phrases associated with various types of compliance issues. Machine learning models, such as neural networks or decision trees, can be used to detect context-dependent risks (e.g., by measuring the semantic similarity between vector representations of the response and vector representations of known risks). Additionally, the risk agent 124 can consider metadata such as the query context, user role, and intended audience to assess the patterns in which to identify and flag as a risk. In some implementations, the risk agent 124 can use machine learning model(s) to identify and flag the risks, assign risk scores to different elements of the response, recommend modifications or redactions to mitigate identified risks, and/or automatically execute the modifications/redactions. The risk agent 124 can maintain and update a knowledge base of current guidelines.

The control agent 126 can refer to an AI-based component (e.g., engine, module) within the data generation platform that manages and enforces output limits and other control parameters for the generated responses. The constraints can include, for example, word count limits, character restrictions, formatting requirements, content structure guidelines, and so forth. In cases where the output exceeds limits, the control agent 126 can summarize the content to condense the content based on term frequency, sentence position, and semantic relevance, and so forth (e.g., using a transformer-based model). To enforce formatting requirements, the control agent 126 can adjust the layout, headings, paragraph structure, or other formatting areas based on a reference template formatted in accordance with the formatting requirements. In some implementations, the control agent 126 can use machine learning models trained on previous correctly formatted or otherwise parameterized outputs to dynamically adjust the response to match user preferences or system settings, such as adjusting the technical complexity of the response. In some implementations, the control agent 126 can track changes made to responses over time, and/or manage access permissions to ensure that only authorized users can view or modify certain types of content.

Figure 2A:
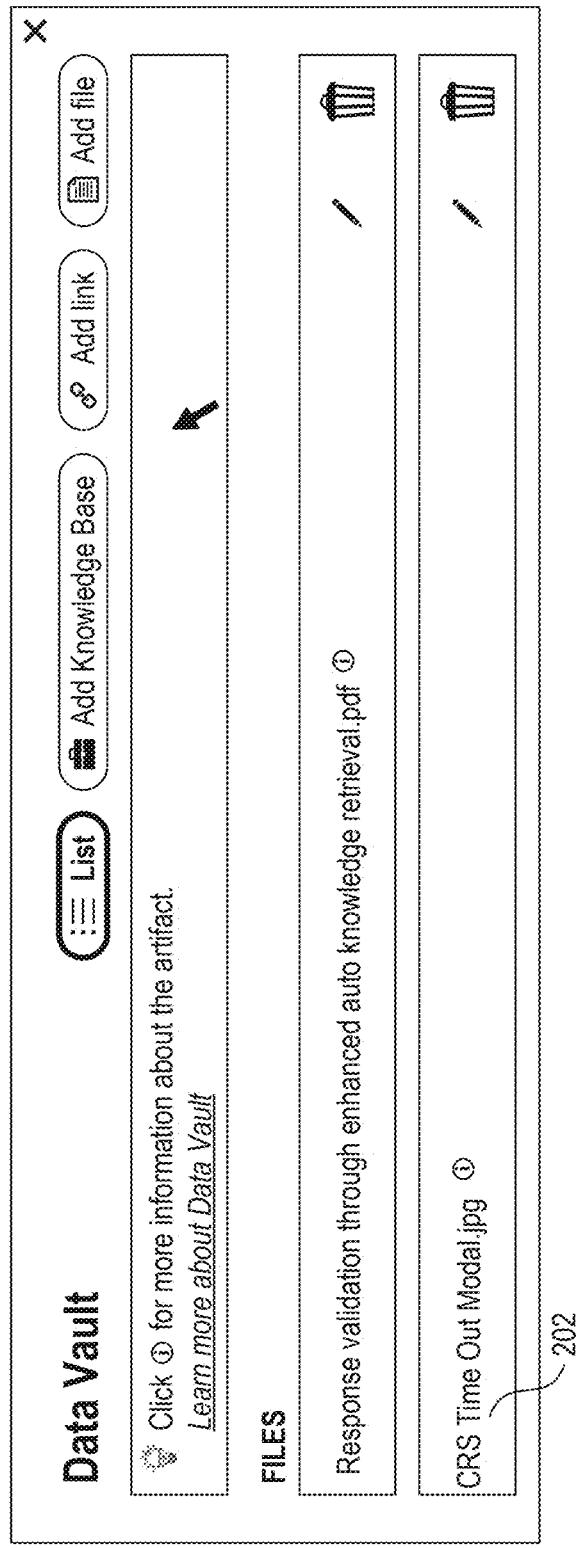
FIG. 2A is a screenshot illustrating uploading context to a data generation platform in accordance with some implementations of the present technology.

FIGS. 2A-2F are screenshots of the GUI of the data generation platform. The GUI can be implemented using components of example computer system 600 illustrated and described in more detail with reference to FIG. 6. Implementations of the example GUI can include different and/or additional components or can be connected in different ways. FIG. 2A is a screenshot illustrating uploading context 202 to a data generation platform in accordance with some implementations of the present technology. The context 202 (e.g., "CRS Time Out Modal.jpg" in FIG. 2A) can include documents, images, or other forms of data used to generate the artifact and/or retrieve information used to generate the artifact. In some implementations, the user is enabled to upload a link, knowledge base, file, and so forth.

Figure 2B:
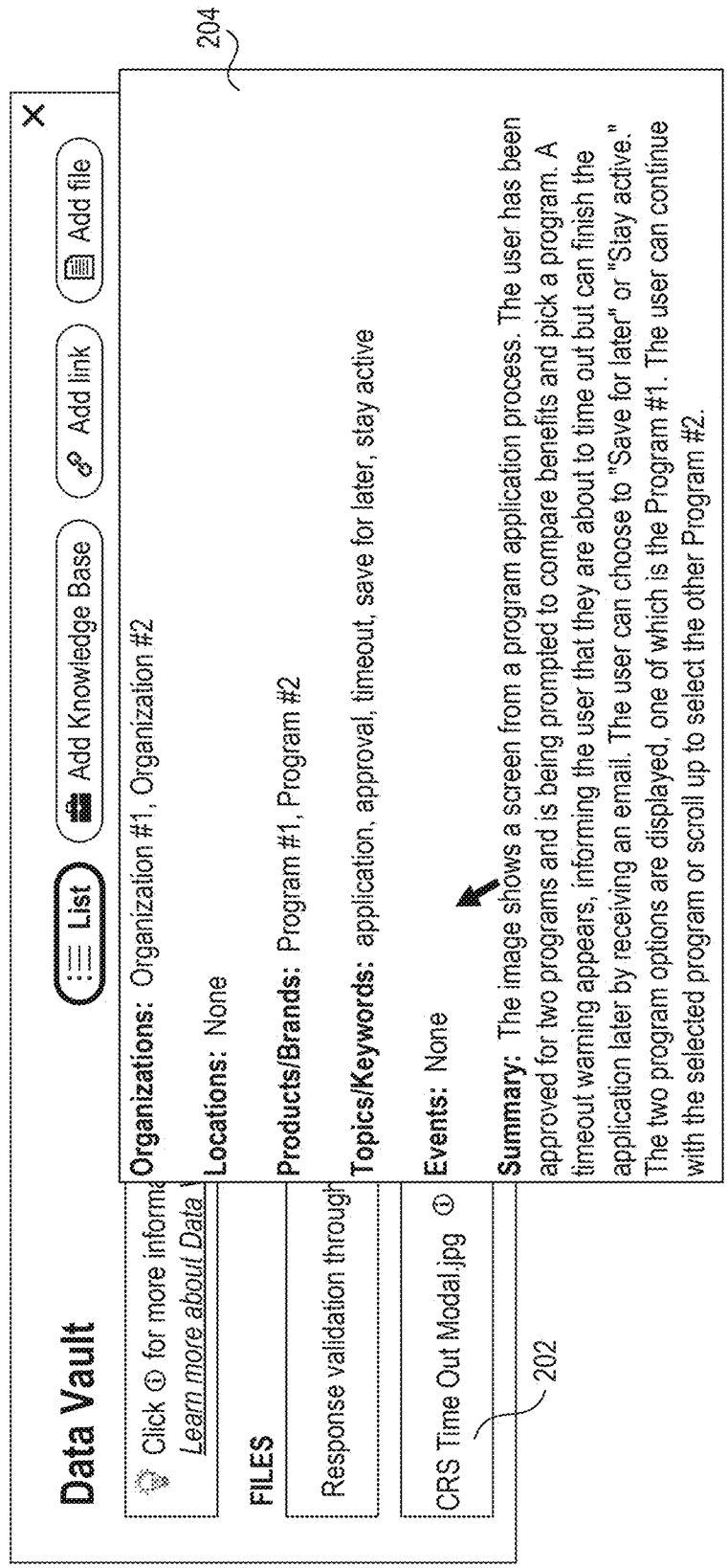
FIG. 2B is a screenshot illustrating a dynamically generated summary of the uploaded context that is generated using a data generation platform according to some implementations of the present technology.

FIG. 2B is a screenshot illustrating a dynamically generated summary 204 of the uploaded context 202 that is generated using a data generation platform according to some implementations of the present technology. The illustrated summary can include various structured elements to represent the information uploaded. For example, in FIG. 2B, the context includes variable fields indicating organizations, and values of the variable fields such as "Organization #1." Key topics and keywords within the input can further be extracted from the context 202, such as "application," "approval," "timeout," "save for later," and "stay active" in FIG. 2B. For instance, the summary in FIG. 2B is a summary of the screen shown in the uploaded context 202, where the user is informed of being approved for two different programs and is prompted to compare the benefits of each program before making a selection.

FIG. 2C is a screenshot illustrating a list 206 of actions configured to be executed using a data generation platform according to some implementations of the present technology. FIG. 2C includes a query 208 and a selected action 210. The actions listed in the figure provide various functionalities that users can perform on the data within the platform. For example, one of the actions in the list 206 of FIG. 2C is "Ask Chat and ask questions about data and documents in your Data Vault" that enables users to interact with a chat interface to inquire about specific data or documents stored in a database. The list 206 in FIG. 2C further includes "Generate Epics, User Stories, and Acceptance Criteria" to enable users to automatically generate detailed developmental milestones, user goals, and the conditions under which user stories are considered complete and provide a structured framework for project management and development tasks.

Additionally, the data generation platform provides options to "Generate E pics" and "Generate User Stories and Acceptance Criteria." "Generate Epics" can cause the data generation platform to generate broad, high-level goals for development projects, whereas "Generate User Stories and Acceptance Criteria" can cause the data generation platform to generate descriptions of end-user requirements and the criteria their completion will be evaluated against. The list 206 in FIG. 2C further includes a "J IRA Comment Analyzer" to enable users to input a JIRA URL and have the data generation platform summarize any comments related to project tasks. The selected action 210 illustrated in the figure is "Generate User Stories and Acceptance Criteria," which prompts the data generation platform to use the provided data and documents to create user stories that outline the tasks and acceptance criteria that define successful completion of the project associated with the provided data.

FIG. 2D is a screenshot illustrating a sequence of intermediate outputs (e.g., intermediate context 212, intermediate query sequence 214) of a data generation platform according to some implementations of the present technology. The intermediate outputs provide a visual representation of the procedural stages and data transformations that occur within the platform from the time data is uploaded to when a final output is generated. In FIG. 2D, the intermediate context 212 shows the progressive refinement of the data through various steps in the programmatic workflow. The intermediate query sequence 214 represents the specific queries made at each stage.

FIG. 2E is a screenshot illustrating a response (e.g., user story 216a, acceptance criteria 216b) of a data generation platform according to some implementations of the present technology. FIG. 2E indicates a specific user story related to handling session timeout notifications during an application process. Since the user requested to be notified when their session is about to time out and have options to either "Stay Active" or "Save for Later," the acceptance criteria outlined for this story includes criteria for managing session timeouts. For example, as illustrated in FIG. 2E, when the session timeout warning appears on the application page, the user should see a clear and informative modal window. If they choose to "Stay Active," their session is extended, and the modal closes. If they opt to "Save for Later," their progress is saved, they receive a confirmation message, and the modal closes.

Figure 2F:
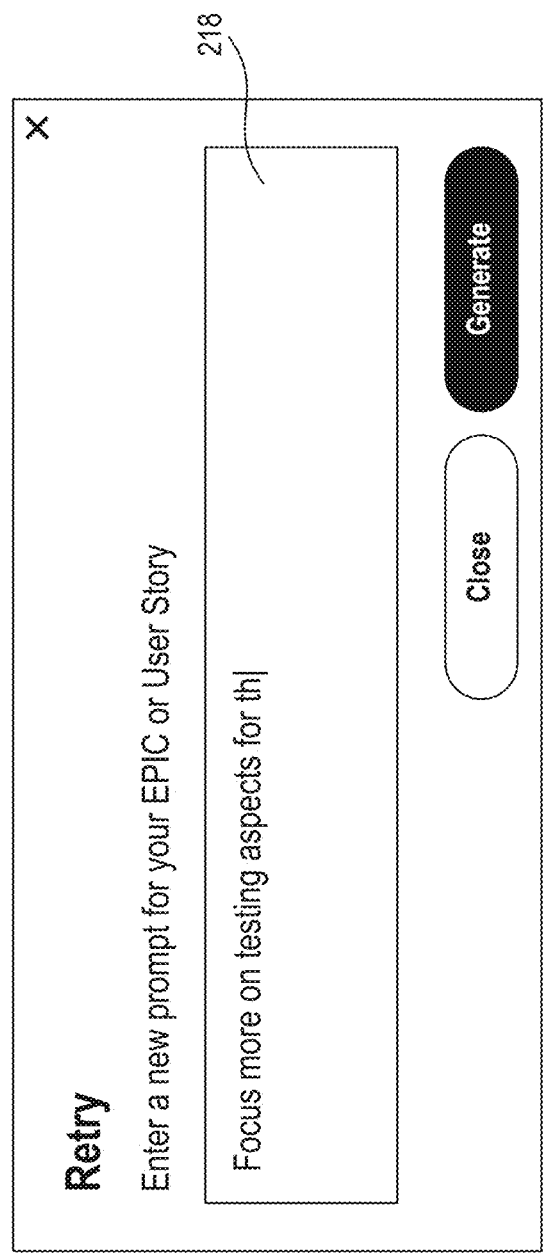
FIG. 2F is a screenshot illustrating a feedback loop of a data generation platform according to some implementations of the present technology.

FIG. 2F is a screenshot illustrating a feedback loop of a data generation platform according to some implementations of the present technology. FIG. 2F includes a feedback input field 218. This input can include text descriptions, ratings, and attachments such as screenshots or additional documents that illustrate the issue or suggestions. The data generation platform can classify the feedback into different categories depending on the type of feedback (e.g., bug report, feature request) by identifying specific keywords, phrases, and patterns that signify the nature of the issue or suggestion conveyed by the user.

FIG. 3 is a screenshot 300 illustrating a set of configurable settings of a data generation platform according to some implementations of the present technology. The screenshot 300 includes a generalization control 302, a response stream control 304, an intermediate output display control 306, a full context control 308, a human-in-the-loop (HITL) control 310, a workflow control 312, and a mock response control 314.

The generalization control 302 enables the data generation platform to apply general knowledge when responding to queries. When enabled, the data generation platform can use information from generalized dataset. The response stream control 304 enables the data generation platform to produce real-time or near-real-time responses. When activated, the data generation platform can progressively stream the answers as the answers are generated. The intermediate output display control 306 determines whether the intermediate steps and activities performed by the data generation platform are made visible to the user. When enabled, users can view the individual steps the data generation platform executes to generate the output. The full context control 308 enables the inclusion of the complete context from the documents stored in the data vault, rather than relying on abbreviated summaries. When this setting is enabled, the data generation platform accesses and considers the full user input (rather than using the summary) to classify the query.

When the HITL control 310 is activated, users can review and intervene at various stages of the process to review the queries that are asked, and the responses generated. The workflow control 312 enables a contemplator that enables the data generation platform to evaluate (e.g., weigh) and display different aspects of a query or task before generating a response. For instance, the data generation platform can weigh multiple solutions before presenting the selected query. The mock response control 314 enables the data generation platform to generate mock or simulated responses from the LLMs. When enabled, users can create and review hypothetical scenarios and responses for testing and validation purposes.

Example Methods of Using the Data Generation Platform

Figure 4:
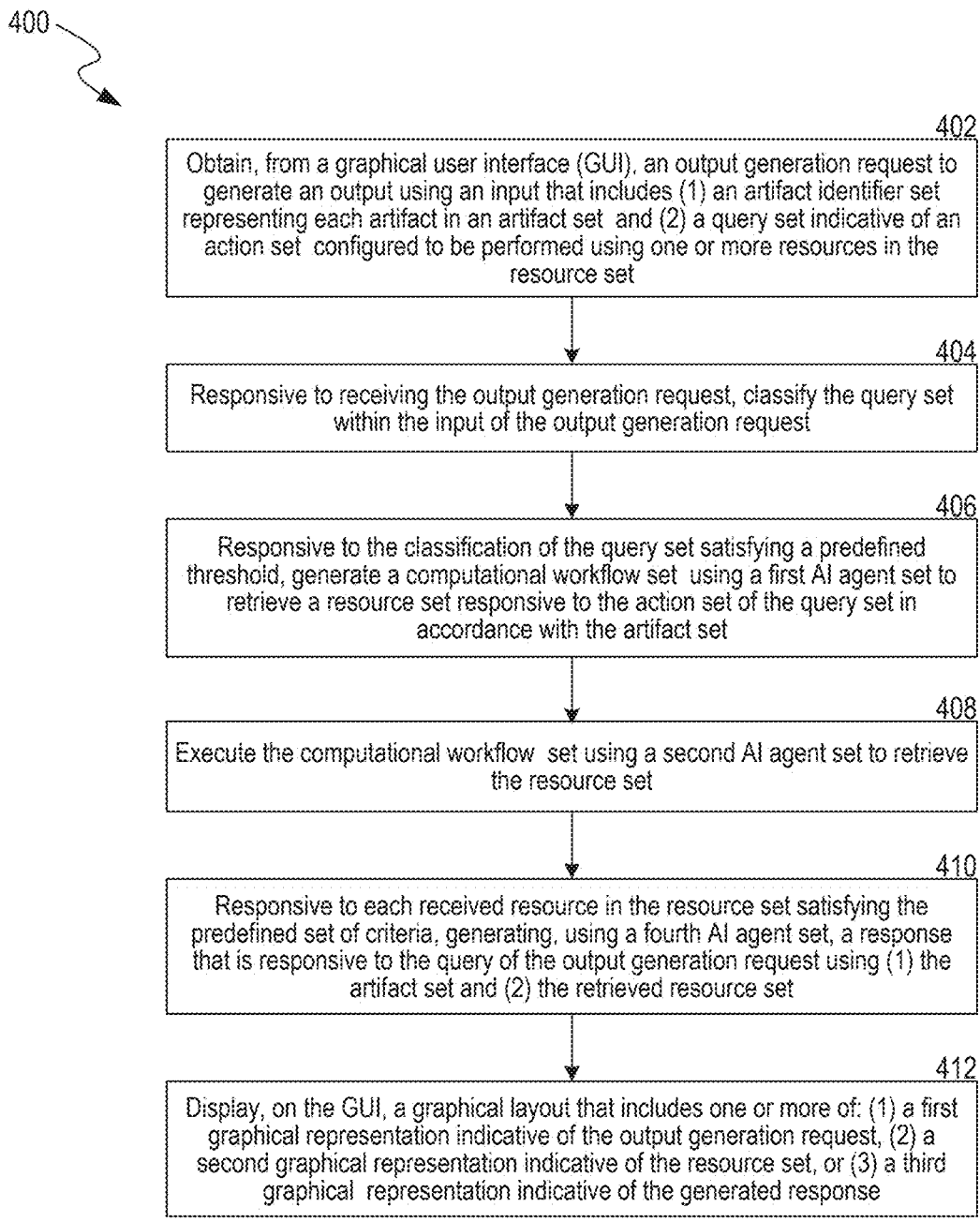
FIG. 4 is a flow diagram illustrating an example process of generating validated responses using a data generation platform according to some implementations of the present technology.

FIG. 4 is a flow diagram illustrating an example process 400 of generating validated responses using a data generation platform according to some implementations of the present technology. In some implementations, the example process 400 is performed by a system (e.g., the data generation platform) including components of the example computing environment 700 illustrated and described in more detail with reference to FIG. 7. The system can be implemented on a terminal device, on a server, or on a telecommunications network core. Likewise, implementations can include different and/or additional operations or can perform the operations in different orders.

In operation 402, the data generation platform can receive, from a graphical user interface (GUI), an output generation request to generate an output using an input that includes an artifact set (e.g., the uploaded files, links, or knowledge bases) uploaded to the GUI and/or a query set indicative of an action set (e.g., generate an epic, user story, acceptance criteria, and so forth) configured to be performed using one or more artifacts in the artifact set. For example, users can upload files directly through the GUI, paste links, or select from various knowledge bases. An API endpoint can receive the data (e.g., the artifact set and query set) transmitted from the GUI.

Responsive to receiving the output generation request, in operation 404, the data generation platform can classify the query set within the input of the output generation request. To classify the query set, the data generation platform can parse the incoming query set to tokenize the text, identify keywords, and extract relevant entities and actions. Once the queries are parsed, the data generation platform can partition the query set into multiple subsets based on predefined rules or using machine learning models to group related queries. For example, the data generation platform partitions the query set into multiple query subsets. Each query subset can be indicative of a subset of the action set. For instance, if the query set includes requests to "generate an epic," "create user stories," and "define acceptance criteria," the data generation platform can group the query set into subsets based on their related actions.

The data generation platform can assign a score to the query set that is indicative of a degree of complexity of the query set using a number of query subsets. The complexity score can be based on the number of queries in each subset, the complexity of the actions requested, the interdependencies between queries, and so forth. For example, generating an epic can be considered more complex than creating a single user story, so the data generation platform assigns a higher complexity score to the subset containing the epic generation query. To calculate the complexity score, the platform can use a weighted scoring system. Each type of action (e.g., generating an epic, creating user stories, defining acceptance criteria) can be assigned a base complexity score. The data generation platform can sum the scores of all actions within a subset and adjust the total based on additional factors such as the number of queries and their interdependencies.

The data generation platform can compare the aggregated complexity score of the query set to a predefined threshold to classify the query set as simple or complex. This threshold can be stored as a configurable parameter in the system, enabling it to be adjusted based on evolving requirements and/or performance metrics. If the aggregated complexity score meets or exceeds the predefined threshold, the data generation platform classifies the query set as a complex query (e.g., "I lost my credit card. What exact steps are needed?"). Otherwise, the data generation platform classifies the query set as a simple query (e.g., When was this file published?").

Responsive to the classification of the query set satisfying a predefined threshold (e.g., classified as a complex query), in operation 406, the data generation platform can generate a computational workflow set using a first AI model set (e.g., the task planning agent 110 in FIG. 1) to retrieve a resource set responsive to the action set of the query set. To retrieve the resource set, the first AI model set can query databases, access external APIs, retrieve documents and files from storage systems, and so forth. The first AI model set can use predefined connectors and data retrieval functions to retrieve the information.

To determine which queries are used in the computational workflow, the first AI model set can use an AI model (e.g., an LLM) as a judge to narrow down potential queries into a specific query sequence. The LLM can rank the queries based on contextual relevance, computational requirements, and so forth. The LLM can convert each query into a vector representation, which is a numerical representation of the query's content and context. The LLM can evaluate the contextual relevance of each query by comparing its vector representation to the vector representation of the user's overall request. Queries that are more directly related to the user's output generation request can receive higher scores. Additionally, queries that require fewer computational resources can receive higher scores. The LLM assigns a score to each query, and queries with higher scores are prioritized and more likely to be used in the computational workflow.

In some implementations, the first AI model set uses historical data to identify common sequences of actions and preferences. Each sequence in the workflow can be weighted based on its computational requirements. The data generation platform can assign weights to different proposed computational workflows themselves based on the complexity of the task, the resources required, the expected execution time, and so forth. The generated computational workflow can be determined based on the weighted total of the workflow satisfying a predefined threshold. Depending on the user's needs and the context of the query, the workflow can be adjusted to prioritize either accuracy or speed.

In some implementations, the classification of a second query set fails to satisfy the predefined threshold. The data generation platform can generate a second response using a second resource set determined based on a degree of similarity between the vector representation set of the second query set and respective vector representations of each resource within the second resource set.

In operation 408, the data generation platform can execute the computational workflow set using a second AI model set (e.g., the research agent 112 in FIG. 1) to retrieve the resource set. For example, the data generation platform transmits a request to a vector database that is indicative of a vector representation set of the input. The data generation platform receives, from the vector database, a vector representation set of the resource set using a degree of similarity between the vector representation set of the input and respective vector representations of each resource within the resource set. For example, the database returns a set of resource vectors that have the highest similarity scores to the input vectors. One or more AI models of the second AI model set (e.g., the validation agent 114 in FIG. 1) can compare each retrieved resource in the resource set with a predefined set of criteria. The criteria can be based on accuracy, completeness, a timestamp, and so forth. If the retrieved resources fail to satisfy the predefined criteria, the AI models can discard the resource from the resource set and/or request additional resources from the vector database.

As used herein, the predefined set of criteria can refer to a collection of rules, guidelines, standards, thresholds, and/or parameters determined to evaluate, validate, and/or filter information, data, and/or resources. The predefined set of criteria can include, but is not limited to, measures of accuracy, relevance, timeliness, completeness, consistency, compliance with regulations, security requirements, and/or other metrics. For example, the predefined set of criteria can require financial data to be within 0.1% of verified sources to be considered "accurate," and/or require information to meet a minimum relevance score of 0.8 out of 1.0 based on semantic similarity to the query. In another example, the predefined set of criteria can require data to be from within the last 30 days to be considered "current" and/or "reliable." The predefined set of criteria can be based on specific industry regulations (e.g., General Data Protection Regulation, Health Insurance Portability and Accountability Act, and so forth).

In some implementations, the predefined set of criteria is customizable and can vary based on the specific context, domain, or requirements of a given task or query. The criteria can be applied automatically by one or more AI models or agents to assess the suitability, validity, or appropriateness of retrieved information before it is used in generating responses or making decisions. The data generation platform can enable users or administrators to adjust threshold values, add or remove specific criteria, and/or assign different weights to various factors based on, for example, a degree of relevance for a particular application.

The customization can extend to the granularity of the criteria. For example, for some queries, a broad set of general criteria may suffice, while others may use more specific validation rules. The data generation platform can use domain-specific criteria sets that can be applied automatically based on the nature of the query or the type of data being processed. Further, as the data generation platform processes more queries and receives user feedback, the data generation platform can use machine learning model(s) to refine the criteria to identify which criteria are most likely to produce satisfactory responses and adjust their weights or thresholds accordingly.

In some implementations, the customization can include temporal aspects, where different criteria are applied based on the time of day, season, or specific events. For example, during tax season, financial criteria can be temporarily modified to accommodate increased data volumes and specific tax-related requirements. The data generation platform can use hierarchical criteria structures, where high-level criteria apply broadly, and more specific sub-criteria can be invoked for particular types of queries or data.

In operation 410, responsive to each received resource in the resource set satisfying the predefined set of criteria, the data generation platform can generate, using a third AI model set (e.g., the synthesis agent 120 in FIG. 1), a response that is responsive to the query set of the output generation request using the artifact set and/or the retrieved resource set. The first AI model set, the second AI model set, or the third AI model set can be the same or different. The response can be text, image, audio, video, and/or multimodal. In some implementations, the data generation platform can adjust the level of detail, tone, and/or format of the response based on user settings or historical interactions.

In some implementations, the data generation platform generates a second response responsive to a second output generation request using the first response. For example, the data generation platform can determine that a degree of similarity between a vector representation of the first output generation request and a vector representation of the second output generation request satisfies a predefined constraint.

In operation 412, the data generation platform can display, on the GUI, a graphical layout that includes a first graphical representation indicative of the output generation request, a second graphical representation indicative of the retrieved resource set, and/or a third graphical representation indicative of the generated response. The first representation can include the text of the query, selected options, and/or relevant metadata. In some implementations, the data generation platform can progressively load the response to a graphical user interface by displaying a first portion of the response while generating a second portion of the response. When a first portion of the response is generated, the portion can be displayed on the GUI. Meanwhile, the data generation platform can continue to generate and load additional portions of the response in the background. This ensures that the user can begin to interact with the response without waiting for the entire response to be generated.

In some implementations, the data generation platform receives a user feedback set corresponding to the generated response through the GUI, and updates a parameter set of at least one of the first AI model set, the second AI model set, or the third AI model set based on the received user feedback. For example, the data generation platform can map the feedback to specific aspects of the models' performance. For instance, if users frequently mention that the generated responses lack detail, the data generation platform can adjust the parameters related to the depth of information retrieval or the verbosity of the response generation. The data generation platform can modify the hyperparameters or weights of the AI models. For the first AI model set (e.g., the task planning agent), the data generation platform can adjust the parameters that control task prioritization and sequencing. For the second AI model set (e.g., the research agent), the data generation platform can adjust parameters related to resource retrieval and validation.

Example Implementation of the Models of the Data Generation Platform

Figure 5:
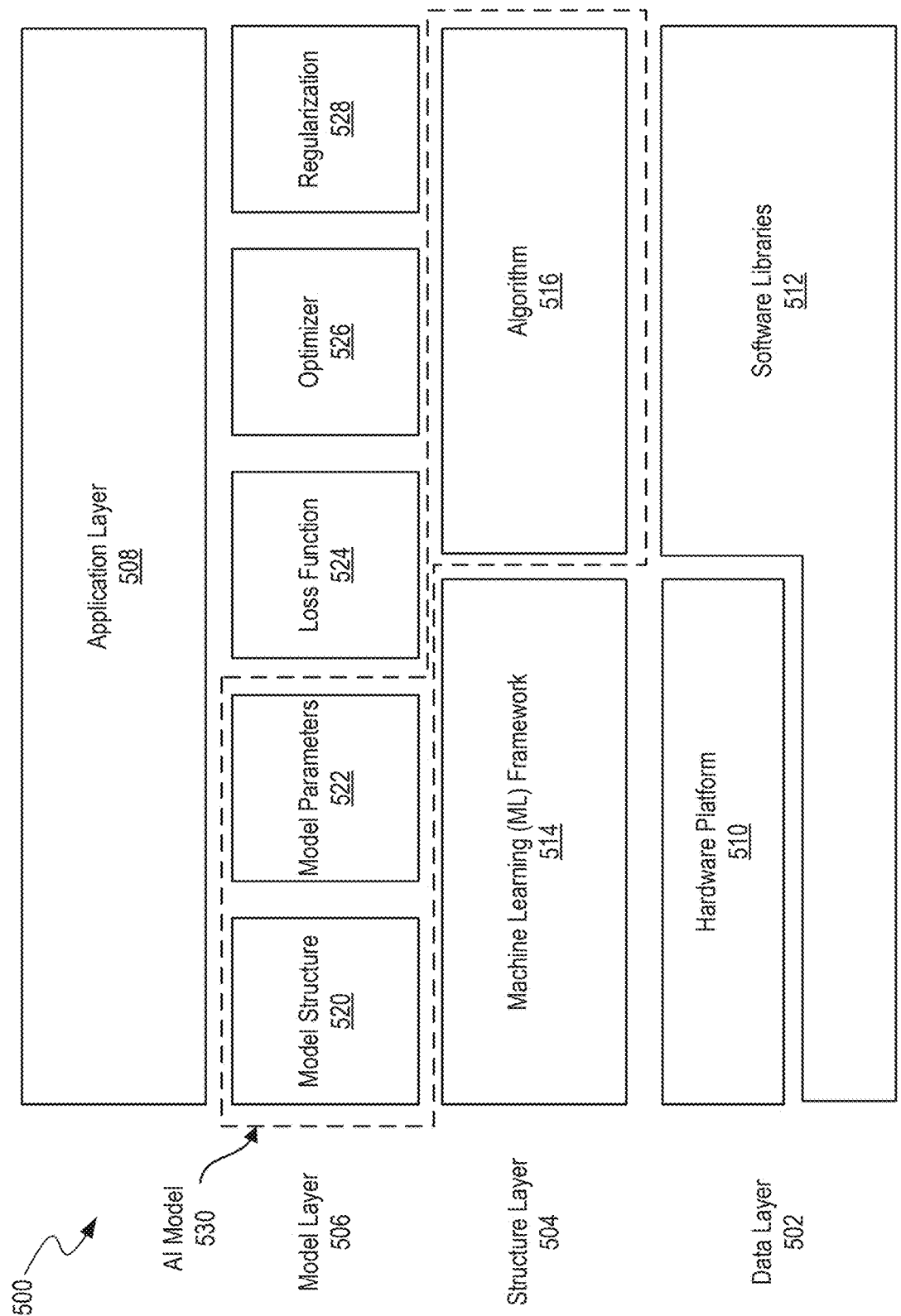
FIG. 5 illustrates a layered architecture of an AI system that can implement the machine learning models of a data generation platform, in accordance with some implementations of the present technology.

FIG. 5 illustrates a layered architecture of an AI system 500 that can implement the ML models of the data generation platform of FIG. 1, in accordance with some implementations of the present technology. Example ML models can include the models executed by the data generation platform, such as the query classifier agent 104, routing engine 106, task planning agent 110, research agent 112, validation agent 114, critic agent 118, synthesis agent 120, security agent 122, risk agent 124, and control agent 126. Accordingly, the query classifier agent 104, routing engine 106, task planning agent 110, research agent 112, validation agent 114, critic agent 118, synthesis agent 120, security agent 122, risk agent 124, and/or control agent 126 can include one or more components of the AI system 500.

As shown, the AI system 500 can include a set of layers, which conceptually organize elements within an example network topology for the AI system's architecture to implement a particular AI model. Generally, an AI model is a computer-executable program implemented by the AI system 500 that analyses data to make predictions. Information can pass through each layer of the AI system 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The optimizer 526, loss function engine 524, and regularization engine 528 work to refine and optimize the AI model, and the data layer 502 provides resources and support for application of the AI model by the application layer 508.

The data layer 502 acts as the foundation of the AI system 500 by preparing data for the AI model. As shown, the data layer 502 can include two sub-layers: a hardware platform 510 and one or more software libraries 512. The hardware platform 510 can be designed to perform operations for the AI model and include computing resources for storage, memory, logic and networking, such as the resources described in relation to FIGS. 6 and 6. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) and graphics processing units (GPUs). CP Us are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CP Us. In some instances, the hardware platform 510 can include computing resources, (e.g., servers, memory, etc.) offered by a cloud services provider. The hardware platform 510 can also include computer memory for storing data about the AI model, application of the AI model, and training data for the AI model. The computer memory can be a form of random-access memory (RAM), such as dynamic RAM, static RAM, and non-volatile RAM.

The software libraries 512 can be thought of suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, enabling them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that enables users to build and deploy the AI model. The ML framework 514 can include an open-source library, an API, a gradient-boosting library, an ensemble method, and/or a deep learning toolkit that work with the layers of the AI system facilitate development of the AI model. For example, the ML framework 514 can distribute processes for application or training of the AI model across multiple resources in the hardware platform 510. The ML framework 514 can also include a set of pre-built components that have the functionality to implement and train the AI model and enable users to use pre-built functions and classes to construct and train the AI model. Thus, the ML framework 514 can be used to facilitate data engineering, development, hyperparameter tuning, testing, and training for the AI model. Examples of ML frameworks 514 that can be used in the AI system 500 include TENSORFLOW, PYTORCH, SCIKIT-LEARN, KERAS, LightGBM, RANDOM FOREST, and AMAZON WEB SERVICES.

The algorithm 516 can be an organized set of computer-executable operations used to generate output data from a set of input data and can be described using pseudocode. The algorithm 516 can include complex code that enables the computing resources to learn from new input data and create new/modified outputs based on what was learned. In some implementations, the algorithm 516 can build the AI model through being trained while running computing resources of the hardware platform 510. This training enables the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning, unsupervised learning, semi-supervised learning, and/or reinforcement learning.

Using supervised learning, the algorithm 516 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of user query 102 in FIG. 1) from various source computing systems described in relation to FIG. 1. Furthermore, training data can include pre-processed data generated by various engines of the data generation platform described in relation to FIG. 1. The user may label the training data based on one or more classes and trains the AI model by inputting the training data to the algorithm 516. The algorithm determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can include classification and/or regression. Classification techniques include teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format. The data generation platform can use unsupervised learning to identify patterns in claim history (e.g., to identify particular event sequences) and so forth. In some implementations, performance of the data generation platform that can use unsupervised learning is improved because the incoming user query 102 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model of the AI system 500. The model structure 520 defines the complexity of the pattern/relationship that the AI model expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMS prop), Radial Base Function (RBF) and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constraint the resulting AI model and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 can include a front-end user interface of the data generation platform.

Example Computing Environment of the Data Generation Platform

Figure 6:
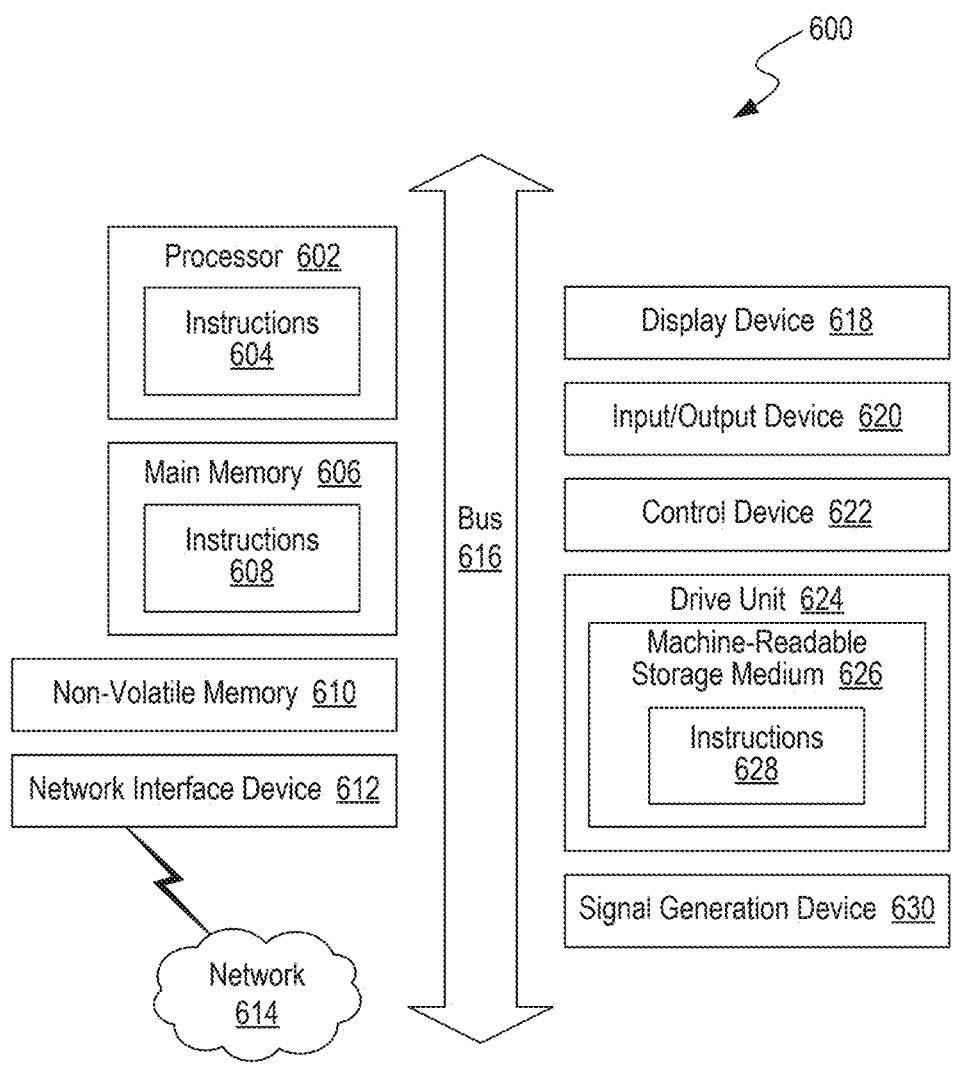
FIG. 6 is a block diagram showing some of the components typically incorporated in at least some of the computer systems and other devices on which the data generation platform operates in accordance with some implementations of the present technology.

FIG. 6 is a block diagram showing some of the components typically incorporated in at least some of the computer systems and other devices 600 on which the disclosed system operates in accordance with some implementations of the present technology. As shown, an example computer system 600 can include: one or more processors 602, main memory 608, non-volatile memory 612, a network interface device 614, video display device 620, an input/output device 622, a control device 624 (e.g., keyboard and pointing device), a drive unit 626 that includes a machine-readable medium 628, and a signal generation device 632 that are communicatively connected to a bus 618. The bus 618 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real time, near real time, or in batch mode.

The network interface device 614 enables the computer system 600 to exchange data in a network 616 with an entity that is external to the computing system 600 through any communication protocol supported by the computer system 600 and the external entity. Examples of the network interface device 614 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 608, non-volatile memory 612, machine-readable medium 628) can be local, remote, or distributed. Although shown as a single medium, the machine-readable medium 628 can include multiple media (e.g., a centralized/distributed database and/or associated caches and servers) that store one or more sets of instructions 630. The machine-readable (storage) medium 628 can include any medium that is capable of storing, encoding, or carrying a set of instructions for execution by the computer system 600. The machine-readable medium 628 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 610, 630) set at various times in various memory and storage devices in computing device(s). When read and executed by the processor 602, the instruction(s) cause the computer system 600 to perform operations to execute elements involving the various aspects of the disclosure.

Figure 7:
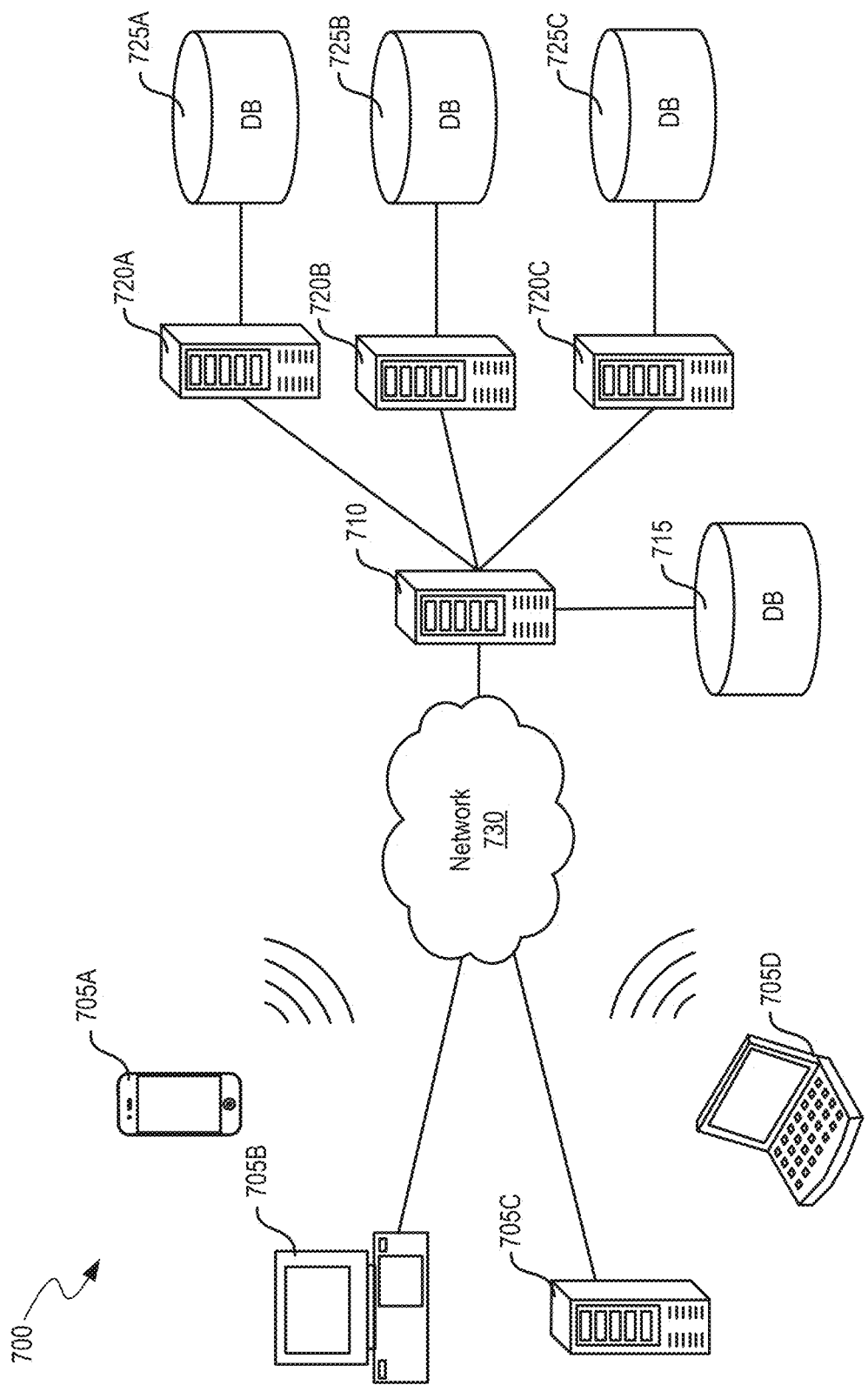
FIG. 7 is a system diagram illustrating an example of a computing environment in which the data generation platform operates in some implementations of the present technology.

FIG. 7 is a system diagram illustrating an example of a computing environment in which the disclosed system operates in some implementations. In some implementations, environment 700 includes one or more client computing devices 605A-D, examples of which can host the data generation platform of FIG. 1. Client computing devices 705 operate in a networked environment using logical connections through network 730 to one or more remote computers, such as a server computing device.

In some implementations, server 710 is an edge server which receives client requests and coordinates fulfillment of those requests through other servers, such as servers 620A-C. In some implementations, server computing devices 710 and 720 comprise computing systems, such as the data generation platform of FIG. 1. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server or client devices. In some implementations, servers (710, 620A-C) connect to a corresponding database (715, 625A-C). As discussed above, each server 720 can correspond to a group of servers, and each of these servers can share a database or can have its own database. Databases 715 and 725 warehouse (e.g., store) information such as claims data, email data, call transcripts, call logs, policy data and so on. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. In some implementations, network 730 is the Internet or some other public or private network. Client computing devices 705 are connected to network 730 through a network interface, such as by wired or wireless communication. While the connections between server 710 and servers 720 are shown as separate connections, these connections can be any kind of local, wide area, wired, or wireless network, including network 730 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A system for generating validated responses using artificial intelligence (AI) models, the system comprising:
   at least one hardware processor; and at least one non-transitory memory storing instructions, which, when executed by the at least one hardware processor, cause the system to:
receive, from a graphical user interface (GUI), an output generation request to generate an output using an input that includes (1) a document set uploaded to the GUI and (2) a query set indicative of an action set configured to be performed using one or more documents in the document set;
responsive to receiving the output generation request, classify the query set within the input of the output generation request by:
partitioning the query set into multiple query subsets, each query subset indicative of a subset of the action set, and
assigning a score to the query set that is indicative of a degree of complexity of the query set using a number of query subsets;
responsive to the classification of the query set satisfying a predefined threshold, generate a computational workflow set using a first AI model set to retrieve a resource set responsive to the action set of the query set;
execute the computational workflow set using a second AI model set to retrieve the resource set by:
transmitting a request to a vector database that is indicative of a vector representation set of the input, and
receiving, from the vector database, a vector representation set of the resource set using a degree of similarity between (1) the vector representation set of the input and (2) respective vector representations of each resource within the resource set, wherein one or more AI models of the second AI model set are configured to compare each retrieved resource in the resource set with a predefined set of criteria;
responsive to each received resource in the resource set satisfying the predefined set of criteria, generate, using a third AI model set, a response that is responsive to the query set of the output generation request using (1) the document set and (2) the retrieved resource set; and
display, on the GUI, a graphical layout that includes (1) a first graphical representation indicative of the output generation request, (2) a second graphical representation indicative of the retrieved resource set, and (3) a third graphical representation indicative of the generated response.

2. The system of claim 1,
wherein the query set is classified as a simple query or a complex query based on the assigned score, and
wherein satisfying the predefined threshold corresponds to the query set being classified as a complex query.

3. The system of claim 1,
wherein the query set is a first query set,
wherein the response is a first response,
wherein the resource set is a first resource set,
wherein the classification of a second query set fails to satisfy the predefined threshold, and
wherein the system is further caused to generate a second response using a second resource set determined based on a degree of similarity between (1) the vector representation set of the second query set and (2) respective vector representations of each resource within the second resource set.

4. The system of claim 1, wherein the system is further caused to:
receive a user feedback set corresponding to the generated response through the GUI; and
update a parameter set of at least one of the first AI model set, the second AI model set, or the third AI model set based on the received user feedback.

5. The system of claim 1, wherein one or more of: the first AI model set, the second AI model set, or the third AI model set are the same.

6. The system of claim 1, wherein one or more of: the first AI model set, the second AI model set, or the third AI model set are different.

7. A non-transitory, computer-readable storage medium comprising instructions thereon, wherein the instructions, when executed by at least one data processor of a system, cause the system to:
obtain an output generation request to generate an output using an input that includes (1) an artifact set and (2) a query set indicative of an action set configured to be performed using one or more documents in the document set;
responsive to receiving the output generation request, classify the query set within the input of the output generation request by:
partitioning the query set into multiple query subsets, each query subset indicative of a subset of the action set, and
assigning a score to the query set that is indicative of a degree of complexity of the query set using a number of query subsets;
responsive to the classification of the query set satisfying a predefined threshold, generate a computational workflow set using a first AI model set to retrieve a resource set responsive to the action set of the query set;
execute the computational workflow set using a second AI model set to retrieve the resource set from a vector database using a degree of similarity between (1) a vector representation set of the input and (2) respective vector representations of each resource within the resource set;
responsive to each received resource in the resource set satisfying a predefined set of criteria, generate, using a third AI model set, a response that is responsive to the query set of the output generation request using (1) the artifact set and (2) the retrieved resource set; and
display, on a user interface, a layout that includes (1) a first graphical representation indicative of the output generation request, (2) a second graphical representation indicative of the retrieved resource set, and (3) a third graphical representation indicative of the generated response.

8. The non-transitory, computer-readable storage medium of claim 7, wherein the output generation request is a first output generation request, wherein the response is a first response, and wherein the system is further caused to:
generate a second response responsive to a second output generation request using the first response,
wherein a degree of similarity between (1) a vector representation of the first output generation request and (2) a vector representation of the second output generation request satisfies a predefined constraint.

9. The non-transitory, computer-readable storage medium of claim 7, wherein the instructions further cause the system to:

progressively load the response to a graphical user interface by displaying a first portion of the response while generating a second portion of the response.

10. The non-transitory, computer-readable storage medium of claim 7,
wherein the query set is classified as a simple query or a complex query based on the assigned score, and
wherein satisfying the predefined threshold corresponds to the query set being classified as a complex query.

11. The non-transitory, computer-readable storage medium of claim 7,
wherein the query set is a first query set,
wherein the response is a first response,
wherein the resource set is a first resource set,
wherein the classification of a second query set fails to satisfy the predefined threshold, and
wherein the system is further caused to generate a second response using a second resource set determined based on a degree of similarity between (1) the vector representation set of the second query set and (2) respective vector representations of each resource within the second resource set.

12. The non-transitory, computer-readable storage medium of claim 7, wherein the instructions further cause the system to:
receive a user feedback set corresponding to the generated response; and
update a parameter set of at least one of the first AI model set, the second AI model set, or the third AI model set based on the received user feedback.

13. The non-transitory, computer-readable storage medium of claim 7, wherein one or more of: the first AI model set, the second AI model set, or the third AI model set are the same.

14. A computer-implemented method for generating validated responses using artificial intelligence (AI) models, the computer-implemented method comprising:
obtaining an output generation request to generate an output using an input set that is indicative of an action set configured to be performed using one or more documents in the document set;
responsive to receiving the output generation request, classifying the input set within the input of the output generation request by:
partitioning the input set into multiple input subsets, each input subset indicative of a subset of the action set, and
assigning a score to the input set that is indicative of a degree of complexity of the input set using a number of input subsets;
responsive to the classification of the input set satisfying a predefined threshold, generating a computational workflow set using a first AI model set to retrieve a resource set responsive to the action set of the input set;
executing the computational workflow set using a second AI model set to retrieve the resource set from a vector database using a degree of similarity between (1) a vector representation set of the input and (2) respective vector representations of each resource within the resource set;
generating, using a third AI model set, a response that is responsive to the input set of the output generation request using the retrieved resource set; and
displaying, on a user interface, a layout that includes (1) a first graphical representation indicative of the output generation request, (2) a second graphical representation indicative of the retrieved resource set, and (3) a third graphical representation indicative of the generated response.

15. The computer-implemented method of claim 14, wherein the output generation request is a first output generation request, wherein the response is a first response, further comprising:
generate a second response responsive to a second output generation request using the first response,
wherein a degree of similarity between (1) a vector representation of the first output generation request and (2) a vector representation of the second output generation request satisfies a predefined constraint.

16. The computer-implemented method of claim 14, further comprising:
progressively load the response on a user interface by displaying a first portion of the response while generating a second portion of the response.

17. The computer-implemented method of claim 14,
wherein the input set is classified as a simple input or a complex input based on the assigned score, and
wherein satisfying the predefined threshold corresponds to the input set being classified as a complex input.

18. The computer-implemented method of claim 14,
wherein the input set is a first input set,
wherein the response is a first response,
wherein the resource set is a first resource set,
wherein the classification of a second input set fails to satisfy the predefined threshold, and
further comprising generating a second response using a second resource set determined based on a degree of similarity between (1) the vector representation set of the second input set and (2) respective vector representations of each resource within the second resource set.

19. The computer-implemented method of claim 14, further comprising:
receive a user feedback set corresponding to the generated response; and
update a parameter set of at least one of the first AI model set, the second AI model set, or the third AI model set based on the received user feedback.

20. The computer-implemented method of claim 14, wherein one or more of: the first AI model set, the second AI model set, or the third AI model set are the same.

* * * * *